No. 745,431. PATENTED DEC. 1, 1903.
J. B. FOOTE.
MILLING MACHINE.
APPLICATION FILED OCT. 28, 1901.
NO MODEL. 9 SHEETS—SHEET 1.
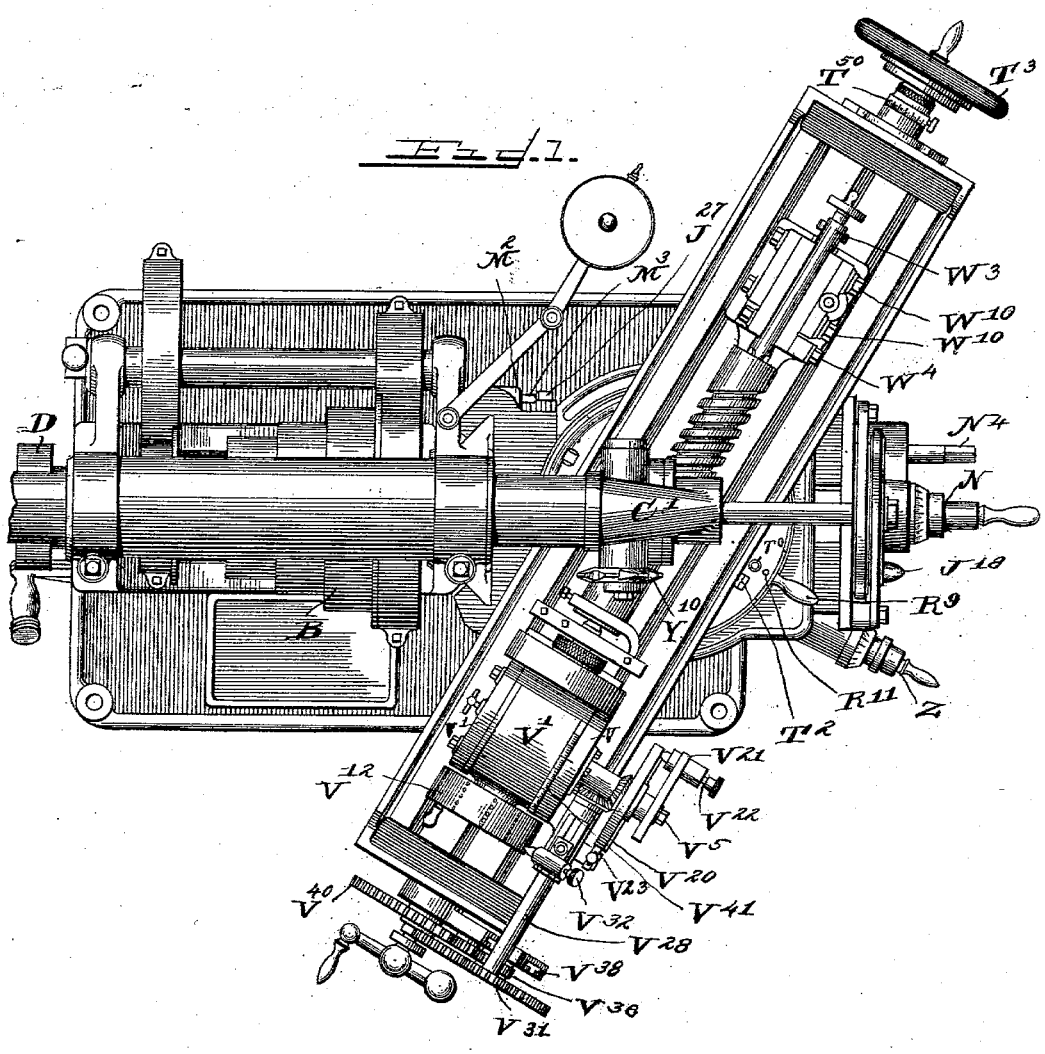
Witnesses
G. A. Naubenschmidt
T. A. Aebles.
Inventor
J. B. Foote,
By W. E. Williams
Atty No. 745,431. PATENTED DEC. 1, 1903.
J. B. FOOTE.
MILLING MACHINE.
APPLICATION FILED OCT. 28, 1901.
NO MODEL. 9 SHEETS—SHEET 2.
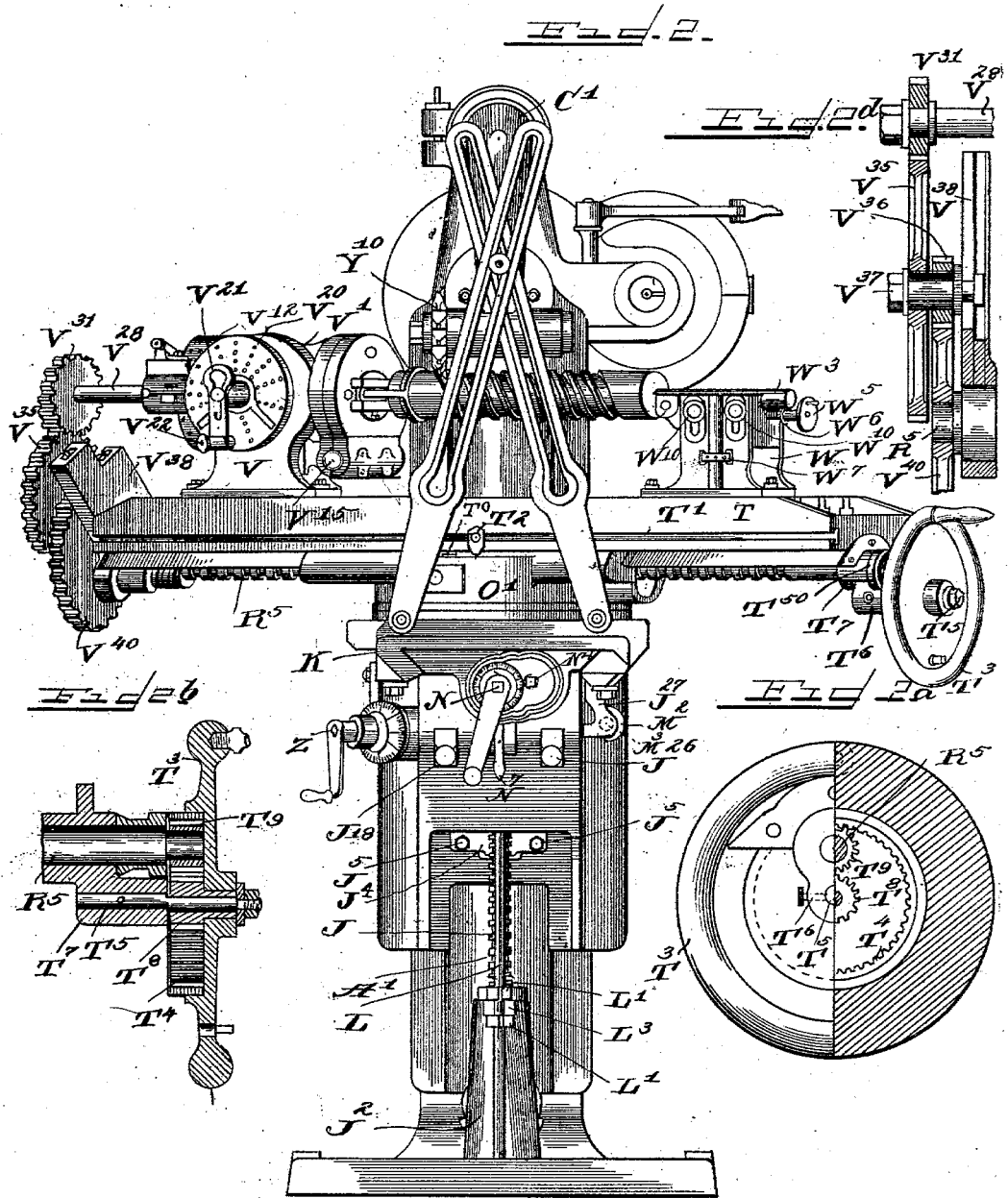

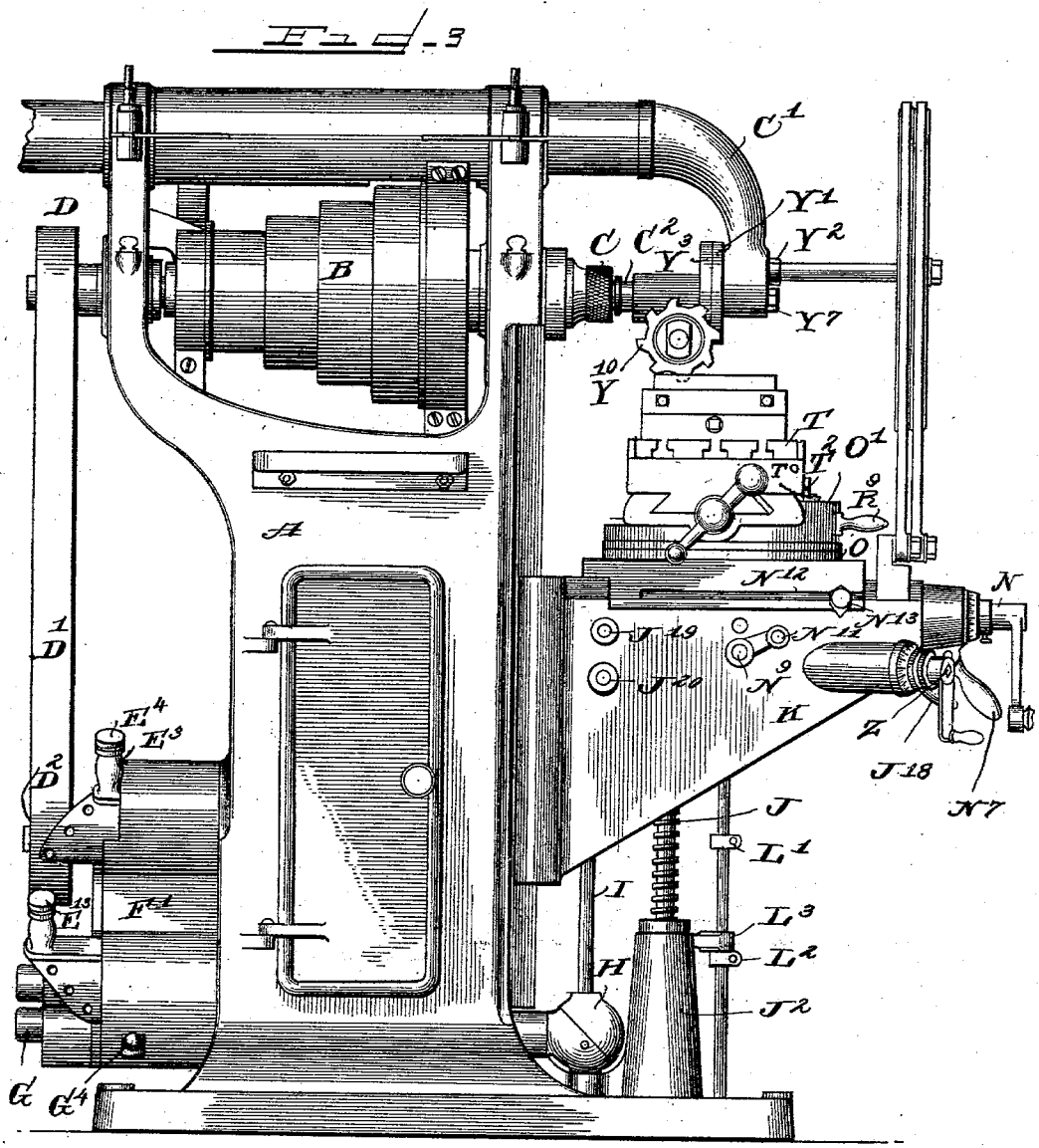

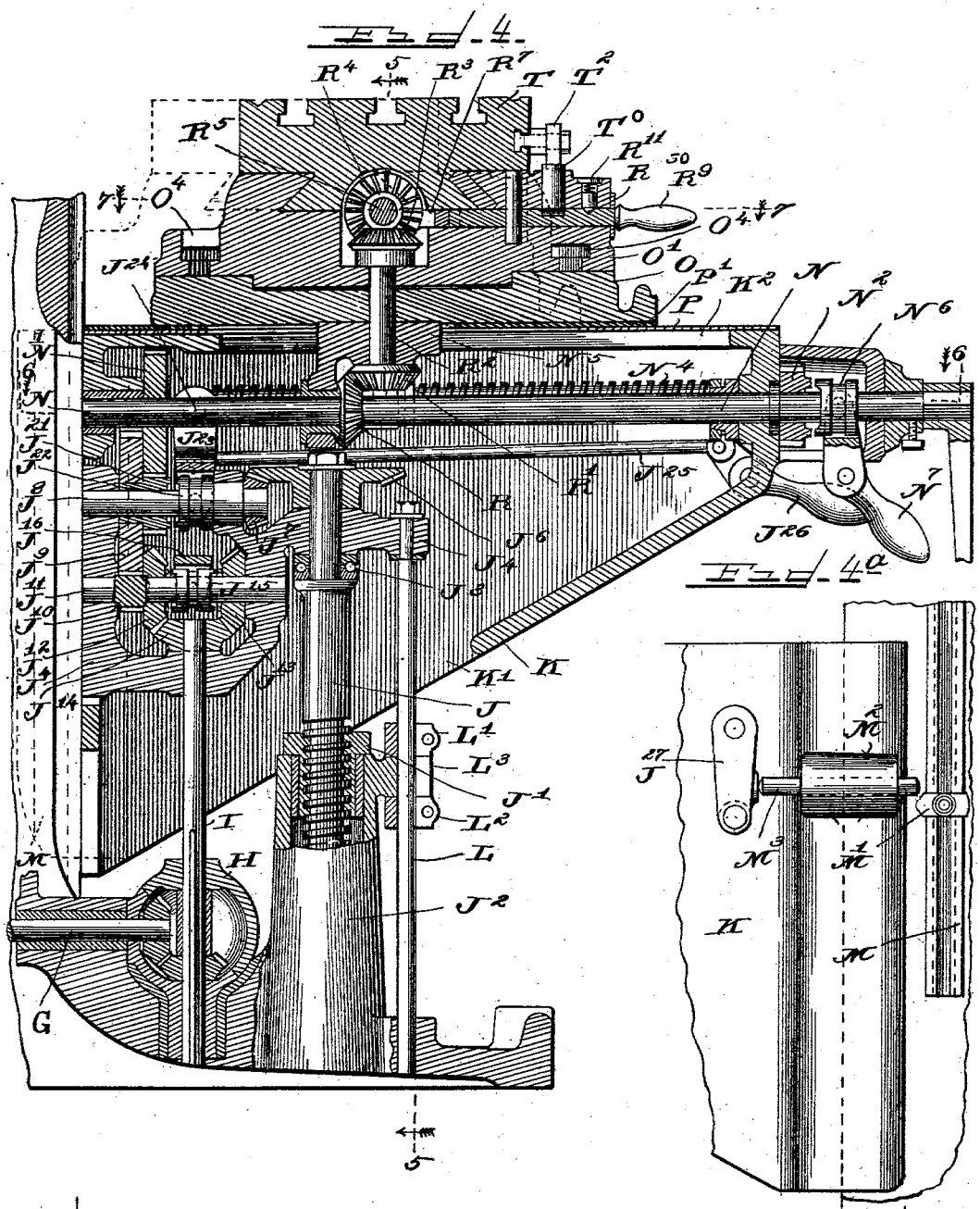

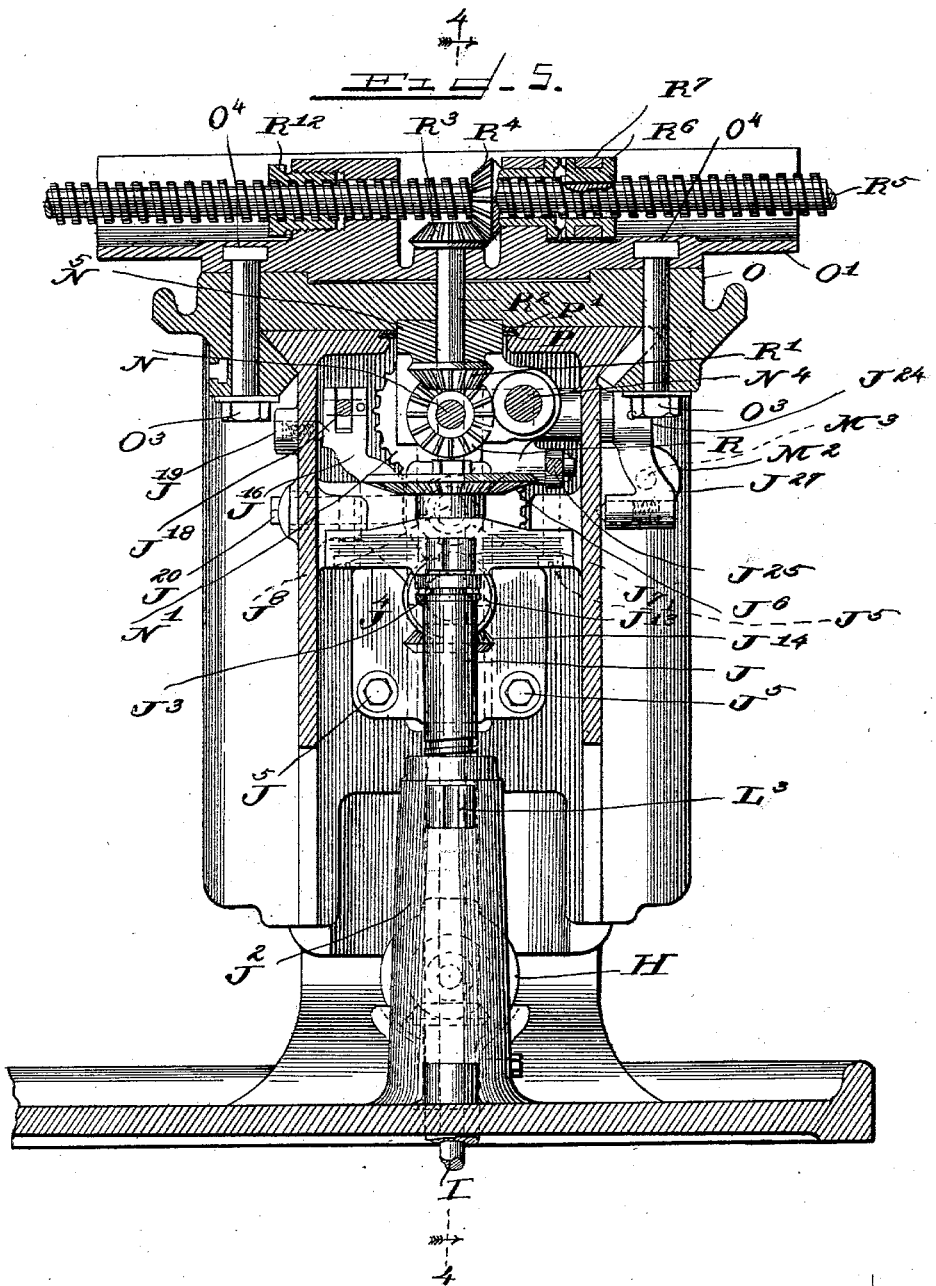

No. 745,431. PATENTED DEC. 1, 1903.
J. B. FOOTE.
MILLING MACHINE.
APPLICATION FILED OCT. 28, 1901.
NO MODEL. 9 SHEETS—SHEET 6.
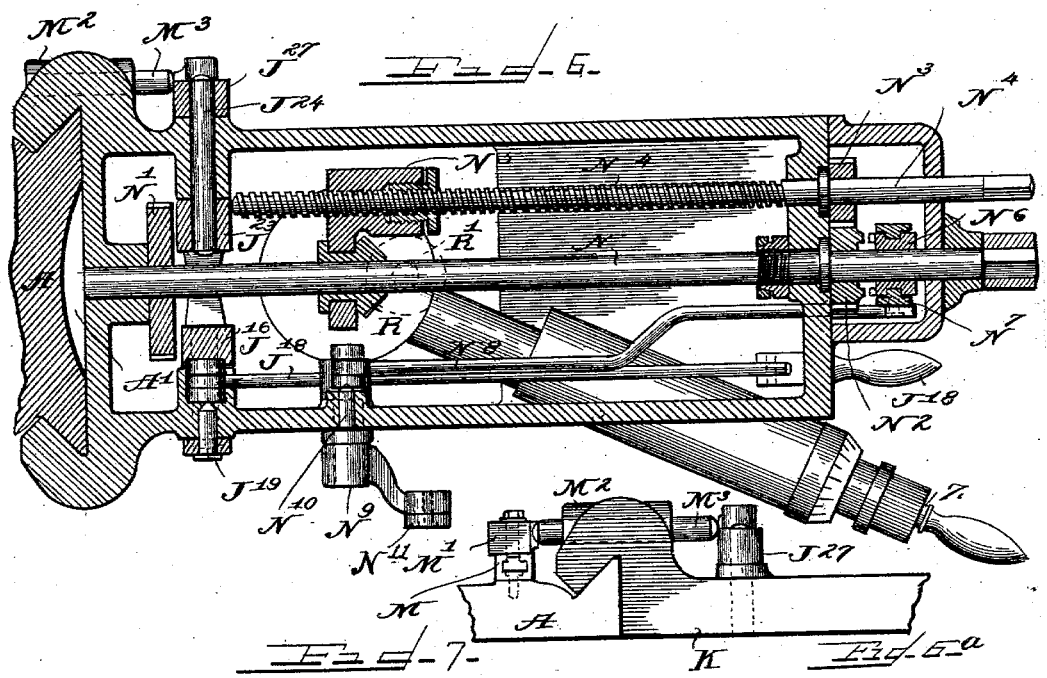
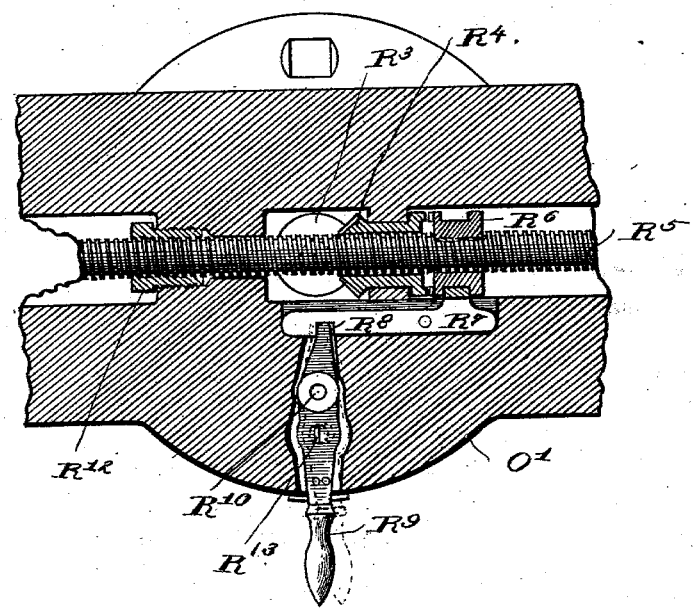
Witnesses
G. A. Pauberschmidt
T. A. Peebles
Inventor
J. B. Foote
W. E. Williams
By Atty

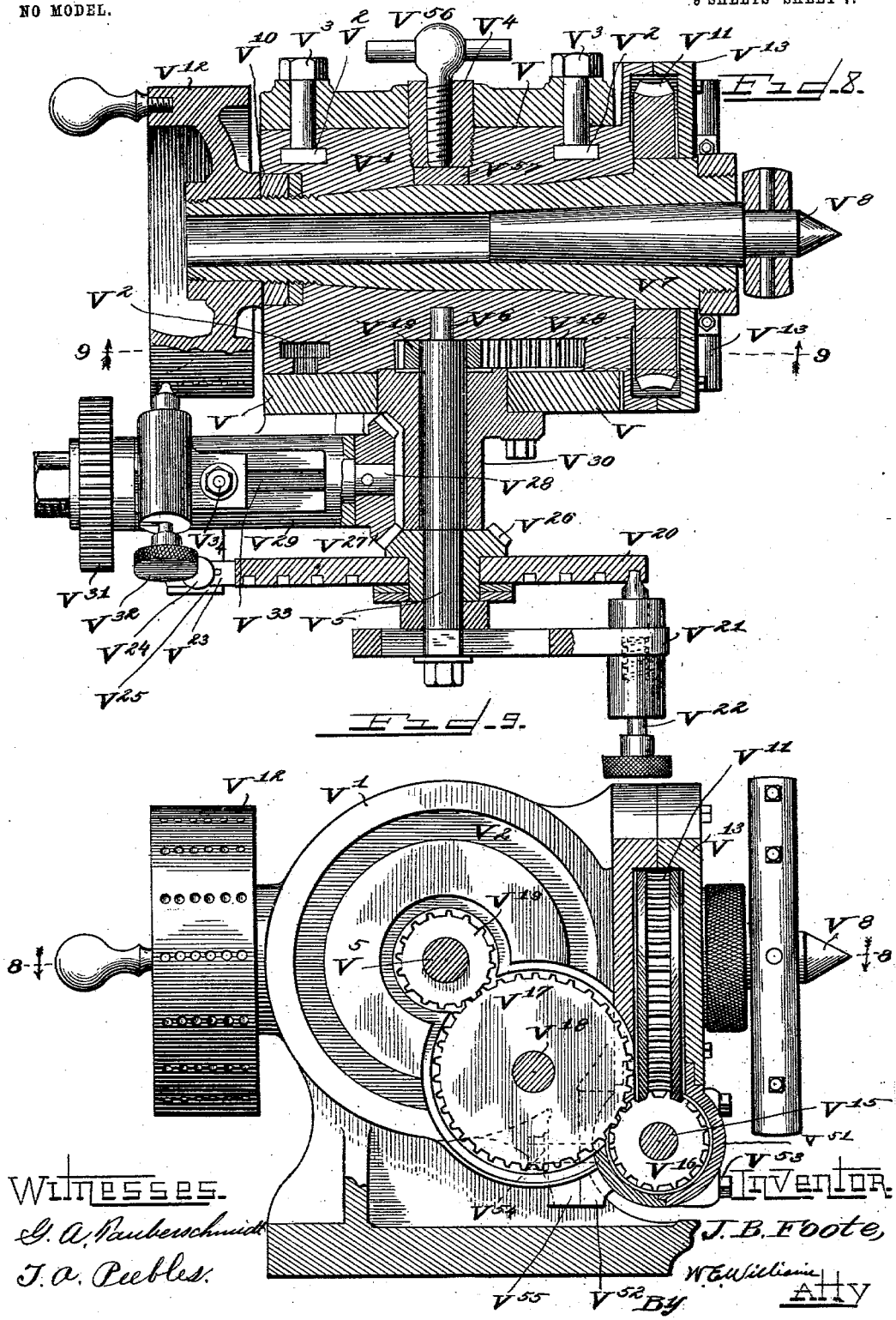

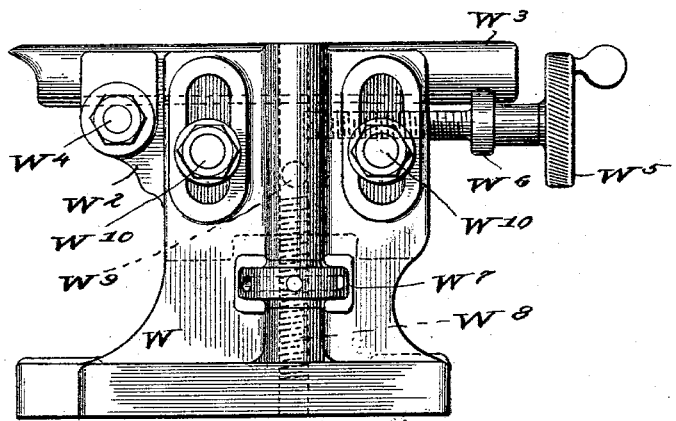
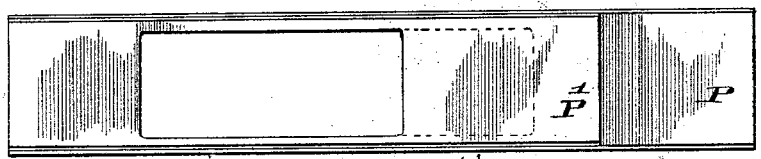
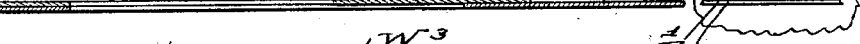
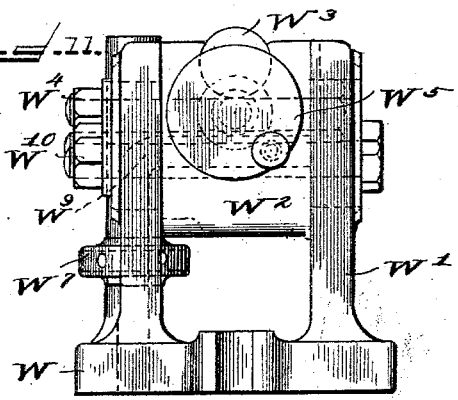

No. 745,431. PATENTED DEC. 1, 1903.
J. B. FOOTE.
MILLING MACHINE.
APPLICATION FILED OCT. 28, 1901.
NO MODEL. 9 SHEETS—SHEET 9.
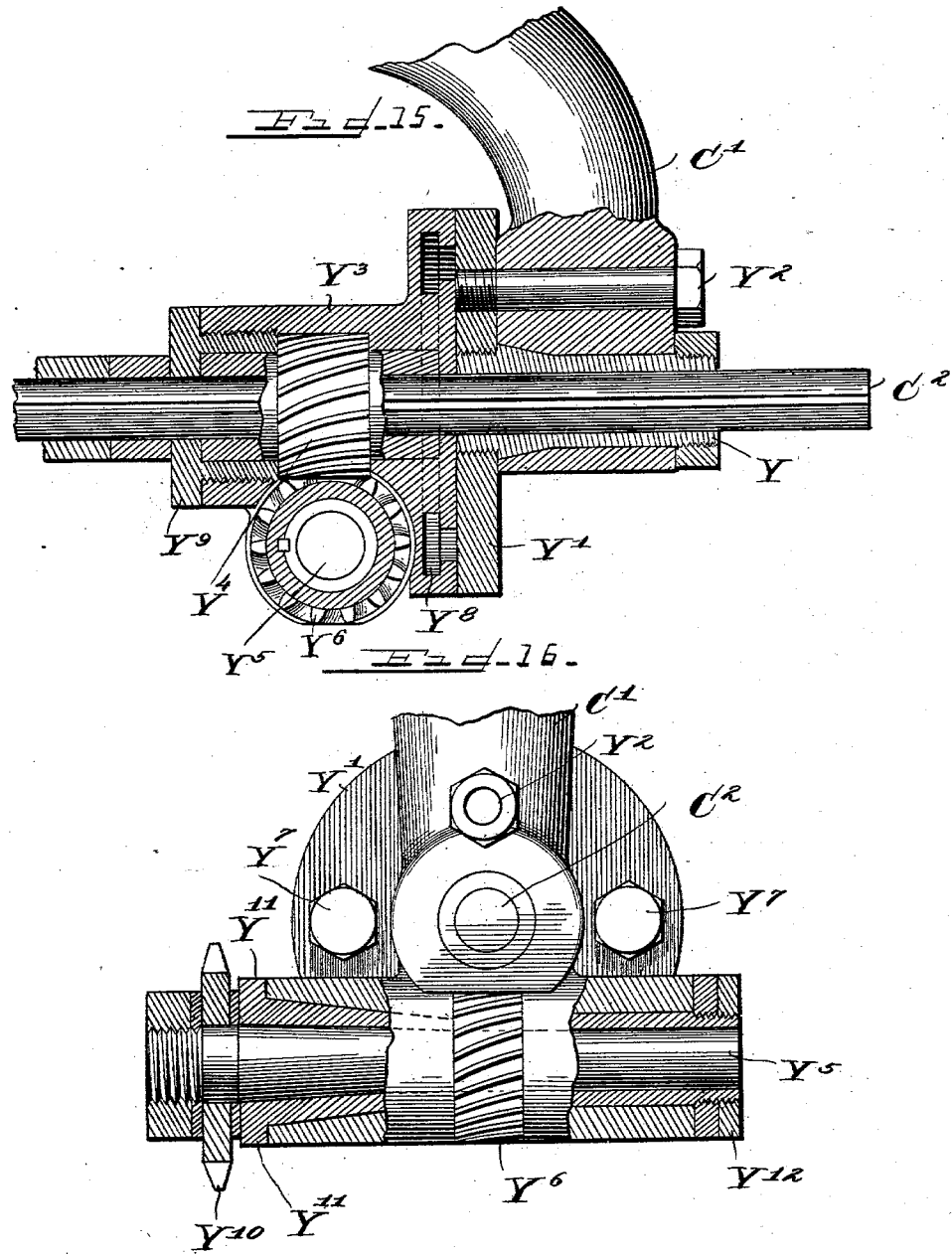
Witnesses.
G. A. Rauberschmidt
J. A. Peebles
Inventor.
J. B. Foote,
By W. E. Williams
Atty No. 745,431.                                                                              Patented December 1, 1903.

UNITED STATES PATENT OFFICE.

JOHN B. FOOTE, OF OAKPARK, ILLINOIS, ASSIGNOR TO JAMES & FOOTE, OF CHICAGO, ILLINOIS, A FIRM.

MILLING-MACHINE.

SPECIFICATION forming part of Letters Patent No. 745,431, dated December 1, 1903.

Application filed October 28, 1901. Serial No. 80,265. (No model.)

*To all whom it may concern:*

Be it known that I, JOHN B. FOOTE, a citizen of the United States of America, and a resident of Oakpark, Cook county, Illinois, have invented certain new and useful Improvements in Milling-Machines, of which the following is a specification.

The general object of my invention is to produce a milling-machine that while extremely compact is adapted for an unusually wide range of very accurate work and is convenient in use and very readily and quickly adjusted for any of its different functions.

In the accompanying drawings, Figures 1, 2 are respectively a plan view and a side elevation of my machine. Figs. $2^a$, $2^b$, $2^c$, $2^d$ are detail views of devices hereinafter described. Fig. 3 is a side elevation of the machine. Fig. 4 is a section on the line 4 4, Fig. 5. Fig. $4^a$ is a detail view of parts on the side opposite that seen in Fig. 3. Figs. 5, 6 are sections on the lines 5 5, 6 6, Fig. 4. Fig. $6^a$ is a detail plan view of certain feed-disconnecting devices. Fig. 7 is a section on the line 7 7, Fig. 4. Fig. 8 is a section on the line 8 8, Fig. 9. Fig. 9 is a section on the line 9 9, Fig. 8. Figs. 10, 11 are respectively side and end elevations of a certain tail-stock. Figs. 12, 13, 14 are detail views showing certain slides in plan, section, and end elevation. Figs. 15 and 16 are respectively side, sectional and front views of certain rack cutting mechanism.

This machine involves a suitable frame supporting a main spindle-drum in the usual way, and, like others of its class, it has below the line of its main spindle a vertically-adjustable knee which is arranged to be raised and lowered by hand or by power, and upon this knee a compound table is arranged to be moved bodily back and forth in a front to rear line. A second table member rotates in a horizontal plane upon the first and is provided with a way, transverse with respect to the knee below, for a third horizontally-sliding table member. Work supported by this third member may thus receive any desired adjustment of position with reference to the main spindle and may be made to travel horizontally at any desired angle therewith. It also involves various other devices adapting it for special kinds of work, and in these in its general construction and arrangement, as well as in peculiar devices and combinations for specific objects, such novelty is found as will hereinafter appear.

Referring now to the drawings, A represents a suitable frame, and C, Fig. 3, the main spindle, driven by the usual cone-pulleys B. Upon a suitable vertical way on the front side of the frame works a forwardly-projecting downwardly-open hollow knee K, which is raised and lowered by the action of a screw J, working in a nut J', seated in a hollow post $J^2$ upon the bed of the frame and having above a shoulder and ball-bearing support $J^3$ for a member $J^4$, rigidly connected with the body of the knee by bolts $J^5$, Figs. 2 and 4. The screw is actuated either by hand through a crank and shaft Z, Figs. 3, 6, having a pinion which engages a bevel-gear $J^6$ on the upper end of the screw, or from the spindle C through a pulley D, belt D', pulley $D^2$, detachably connected to and rotating a shaft G, bevel-gears, shaft I, Fig. 4, gear $J^{14}$, gear $J^{12}$ or $J^{13}$, shaft $J^{11}$, gears $J^{10}$ $J^9$, shaft $J^8$, and gears $J^7$ $J^6$. The speed of the shaft G, from which various other mechanisms are actuated, is varied at will by devices not herein claimed nor shown in detail.

The gears connecting the shafts G I are inclosed in a suitable housing H, and one of them is splined upon the shaft I, so that the latter may rise and fall without affecting the engagement of the gears. This shaft has a bearing above in the member $J^4$ and rises and falls with it, and to its upper end is fixed the gear $J^{14}$. The transverse shaft $J^{11}$ is mounted in the same member, and upon it, on opposite sides of the gear $J^{14}$, are loosely mounted the gears $J^{12}$ $J^{13}$, each adapted to be engaged and disengaged by a clutch $J^{15}$, splined upon the shaft and moved at will into engagement with either or neither gear by means of a lever $J^{16}$, pivoted to the knee at $J^{20}$, actuated by rod and handle $J^{18}$, and locked by a pin $J^{19}$, Figs. 2, 3, 4, 5, 6. Thus a slight movement of the handle arrests the shaft $J^{11}$ or causes it to rotate in either direction desired, and through the gears $J^{10}$ $J^9$ the motion of this shaft is communicated to the shaft $J^8$, which bears the gear $J^7$, meshing with the gear $J^6$ upon the screw-shaft J, and also drives other mechanism to be described. The gear $J^9$ just mentioned is rigidly connected with a gear $J^{21}$ and both are loose upon the shaft $J^8$, but are caused to engage and disengage it by means of a clutch $J^{22}$, similar to the clutch $J^{15}$ below, operated by an arm $J^{23}$, mounted on a pin or shaft $J^{24}$, Fig. 6, actuated by a rod $J^{25}$ and hand-lever $J^{26}$, Figs. 4, 5, 6, and locked by a pin working in an arm $J^{27}$ and engaging the knee, Fig. 5. It follows that if the shaft $J^{11}$ be rotating the screw J is actuated or not, according as the clutch $J^{22}$ is in or out of engagement. For accurately locking the knee member $J^4$ or limiting its movement—for example, when it is desired to have the table move between predetermined limits—I fix to the member $J^4$ a rod L, provided with adjustable stop-collars $L'$ $L^2$ to engage a rigid projection $L^3$ from the post $J^2$. Fig. 3 shows the collars in position for limiting movement, and Fig. 4 shows them as locking the knee. To automatically disengage the clutch $J^{22}$, and thus arrest the moving knee, a slotted bar M, Figs. $4^a$, $6^a$, is fixed to the frame, and in the slot is adjusted a block $M'$, and a sliding pin $M^3$ is mounted in a lug $M^2$ upon the knee in such position that as the knee rises or falls the pin may meet the block $M'$ and be thereby forced against the arm $J^{27}$, swinging it and releasing the clutch. The upper portion of the knee is adapted to form a way on which a lower member O of the table may slide in a front to rear direction. Such movement is produced by the rotation of the shaft $J^8$, whose pinion $J^{21}$ engages a gear $N'$ upon a shaft N, upon the forward end of which is loosely mounted a gear $N^2$, meshing with a gear $N^3$, upon a parallel threaded shaft $N^4$, rotating without advance in bearings in the knee, Figs. 4, 5, 6. The screw works in a nut $N^5$, fixed to the lower member of the table, and consequently the table is carried along the knee as the screw rotates. The gear $N^2$ is at will made to rotate with the shaft by means of a clutch $N^6$, splined upon the shaft and actuated by a lever $N^7$, connected by a rod $N^8$ to the inner arm of a short rock-shaft $N^9$, Figs. 3, 6, locked by a pin $N^{10}$ and bearing without the knee-shell an arm $N^{11}$ in position to be struck as the table moves back and forth by a block $N^{13}$, adjustably fixed in a groove $N^{12}$ in the lower member of the table, and thereby the clutch $N^6$ is disengaged automatically, and the movement of the table is arrested at any desired point.

Upon the table member O rests a second horizontally-revoluble member $O'$, which in turns supports an upper sliding member T, upon which work may be secured. The member $O'$ has in its lower side an annular groove $O^4$, adapted to receive the heads of the bolts $O^3$, which adjustably clamp it to the member O, and, above, it is provided with a way to hold and guide the member T. The latter is moved back and forth in this way by the shaft N, as will presently appear.

A gear R is revolubly mounted in the nut $N^5$ and also splined upon the shaft N. It is therefore carried along the shaft by the nut and yet rotates with the shaft. It meshes with a gear $R'$, fixed to a shaft $R^2$ passing vertically through the nut and table member O into the member $O'$ and bearing upon its upper end a gear $R^3$, in the center of the latter member, meshing with a gear $R^4$, mounted loosely upon a horizontal screw-shaft $R^5$ and rotating in a bearing in the member $O'$, which keeps it permanently engaged with the gear $R^3$. The gear $R^3$ may be made to rotate the screw-shaft by means of a clutch $R^6$, splined upon the shaft and thrown into and out of engagement with the gear by a bar $R^7$ lying in a recess in the member $O'$ and actuated by a hand-lever $R^9$, pivoted at $R^{10}$, engaging in a notch $R^8$ in the bar, and locked by a pin $R^{11}$, engaging in a recess $R^{30}$, Figs. 4, 7.

The screw-shaft $R^5$ is revolubly fixed at its ends to the member T, and it works in a nut $R^{12}$, fixed to the member $O'$, and hence when it is rotated the member T is forced to travel along its way in the member $O'$. The table member T has a slot $T'$ in its lateral face, and in this slides a block $T^2$, which may be fixed at any point, and in the path followed by this block as the table moves is a sliding pin $T^0$, projecting from the member $O'$ immediately over an inclined recess $R^{13}$ in the lever $R^9$, and the parts are so formed that the depressing of the pin by the block forces the lever to move and disengage the clutch $R^6$, thus allowing the member T to come to rest. Obviously the adjustment of the block may cause this automatic disengagement to occur at any desired point. When the member T is thus arrested, it may be returned to initial position by means of a hand-wheel $T^3$, Fig. 2, mounted on a stud $T^5$, carried by a block $T^7$, fixed to the table member T. This wheel has on its inner side an internal gear $T^4$, within which lies a gear $T^9$ on the end of the screw-shaft $R^5$ and a pinion $T^8$ upon the stud $T^5$, and that portion of the stud upon which the wheel and pinion are mounted is eccentric to the portion lying in the block $T^7$. The construction is such that when the outer portion of the stud is at its greatest distance from the screw-shaft the internal gear engages the gear $T^9$ and the pinion $T^8$ is wholly below the latter gear, but when the stud is rotated one hundred and eighty degrees in the block the internal gear is raised out of engagement and the pinion is brought into engagement with the gear $T^9$. A pin $T^6$ locks the stud in either position. The one engagement gives a quick rotation of the screw, the other a slow one.

In Figs. 1, 2 the dividing-head is shown as mounted upon the table, and in Figs. 8, 9 it is shown in detail. The frame is a strong base V, secured to the table by bolts and provided with parallel vertical standards, between which fits an angularly-adjustable spindle-block $V'$, having in its lateral faces T-shaped annular grooves $V^2$ to receive the heads of bolts $V^3$, which pass through the standards and clamp the block rigidly in any desired angular adjustment, the angle being indicated by a peripheral scale $V^{41}$. The angular adjustment is on one side about a stud $V^4$, screwed into the block and having a bearing in the corresponding standard, and on the other side about the end $V^6$ of a shaft $V^5$ in alinement with the stud. A hollow spindle $V^7$ passes centrally through the block and carries in its front end a center $V^8$, a collar $V^{10}$ serving to compensate for wear, and a screw $V^{56}$ working against a friction-block $V^{57}$ to lock it securely in any desired position. Upon the forward end of the spindle is fixed a worm-gear $V^{11}$, which is inclosed by a flange of the block V and a flanged plate $V^{13}$, secured thereto by bolts. Below the worm-gear is a shaft $V^{15}$, bearing a worm $V^{50}$, engaging the worm-gear, and a pinion $V^{16}$, by which the shaft is rotated, the whole being inclosed by recessed blocks $V^{51}$ $V^{52}$, secured together by screws $V^{53}$, forming at the same time a casing and a shaft-bearing. These blocks are supported by bolts $V^{54}$, passing through slots in a flange $V^{55}$, projecting from the block $V'$, and by loosening the bolts, so that they can move in the slots, the worm may be moved out of engagement with the worm-wheel. The gear $V^{16}$ is driven from the shaft $V^5$ by a gear $V^{19}$ and an intermediate gear $V^{17}$, mounted on a stud $V^{18}$, projecting from the block $V'$, and the shaft $V^5$ is supported on a bearing $V^{30}$, fixed in the standard V. Upon the shaft $V^5$ is loosely mounted a gear $V^{26}$, to which is fixed a dial-plate $V^{20}$, and upon the outer end of the shaft is secured an arm $V^{21}$, bearing a pin $V^{22}$ to engage in any of the apertures on the dial-plate. When desired, the dial-plate may be locked by means of a bar $V^{23}$, adjustably fixed to a bracket $V^{29}$ on the standard V by a thumb-screw $V^{24}$. This bracket also bears a pin $V^{32}$ for locking a dial-wheel $V^{12}$, fixed upon the projecting rear end of the hollow spindle $V^7$, the pin being adjusted bodily along the slot $V^{33}$ and locked in any desired adjustment by a screw $V^{34}$. This bracket further affords a bearing for a shaft $V^{28}$, having at its inner end a gear $V^{27}$, engaging the gear $V^{26}$, and at its outer end a gear $V^{31}$, which is driven when desired from the screw-shaft $R^5$ (Figs. 2, $2^d$) by means of gears $V^{35}$ $V^{26}$ $V^{40}$, the gears $V^{35}$ $V^{26}$ being mounted upon a stud $V^{37}$, adjustably fixed in an angularly-adjustable bracket $V^{38}$, projecting from the table member T, Figs. 1, 2.

Upon the table member T a tail-stock W, Figs. 1, 2, 16, 17, is adjustably secured by bolts. From the bed-plate W of the tail-stock rise parallel plates $W'$, between which fits a block $W^2$, in which a center pin $W^3$ is clamped by a screw $W^4$. The pin is adjusted longitudinally by a screw and hand-wheel $W^5$, having a circular projection $W^6$ engaging a notch in the pin. The block $W^2$ is mounted upon a horizontal pivot $W^9$, which has a threaded end portion extending vertically downward in a recess in one of the plates $W'$ and provided with a nut $W^7$, lying in a horizontal slot in the plate and serving to adjust the block vertically. Bolts $W^{10}$, passing through slots in the plates $W'$, clamp the block in any desired position, and the slots are wide enough to permit all needed angular adjustment of the block on its pivot.

For rack-cutting the main frame carries an adjustable overhanging arm $C'$, whose forward end supports a bearing for a spindle-shaft $C^2$, fixed at the end of the spindle C, Figs. 1, 2, 3, 21, 22, and having splined upon it a spiral gear $Y^4$. The bearing consists of a sleeve Y, seated in the arm $C'$ and provided with a flange $Y'$, which is rigidly fixed to the arm by a bolt $Y^2$. To the inner face of the flange a block $Y^3$ is adjustably secured by bolts $Y^7$, whose heads engage in an annular recess $Y^8$ in the block. The block forms a housing for the gear $Y^4$ and holds the latter against movement along its shaft, since a threaded collar $Y^9$ abuts against the gear. The block also supports a transverse shaft $Y^5$, fixed in a cone-sleeve $Y^{11}$, held in place by lock-nuts $Y^{12}$ and bearing a central spiral gear $Y^6$, engaging the gear $Y^4$, and upon the projecting end of the shaft $Y^5$ is mounted a detachable cutter $Y^{10}$.

In order that the parts above the knee may be moved bodily along the same and yet be driven by devices within it, the knee is provided with a slot $K^2$, Fig. 4. It is important, however, that this slot should not allow material to pass into the knee, and superposed slides P $P'$, Figs. 4, 5, 18, 19, 20, are fitted in a way in the knee. Each has a central slot in which the nut $N^5$ may move, the slot in the lower and longer slide being longer than that in the upper one. The nut $N^5$ being at its rear limit of movement, the slides have the positions shown in Fig. 4 and close all that portion of the knee-slot not then covered by the table member O. When the table moves forward, the nut reaching the end of the slot in the upper slide carries that slide forward, and thus closes the opposite end of the knee-slot. When the nut reaches the end of the slot in the lower slide, both slides are carried forward, but the nut reaches the end of the knee-slot before the rear ends of the slides reach the rear end of the knee-slot. On the return movement of the table like movements of the slides restore them to initial position, and thus the slot is always closed, so that nothing can enter the knee.

It may be observed that any desired change in the feed of the machine may be made almost instantly without shifting of belts or disarrangement of any parts; that the somewhat complex mechanisms in the knee may be taken out as a whole by detaching the knee member J⁴ and removing them through the opening K' in the lower side of the knee; that the parts within the knee are always protected from dirt and metal cuttings falling from above; that by means of the rotary table member the member above may be made to travel at any angle with the main spindle; that the rotary table member and its bolt-engaging groove are fully circular, the frame of the machine being cut away at A', Fig. 6, to receive the edge of the table; that the option of using a quick or a slow operation of the screw R⁵ is important; the dividing head construction allows the use of a large worm-wheel and dial-plate, giving accuracy in gear-cutting without increasing the size of the head as a whole; that the tail-stock has adjustments adapting it for a great variety of work, and that the rack-cutting devices obviate the necessity of displacing the arm or attaching cumbrous parts, as supports or otherwise.

What I claim is—

1. The combination with a frame and a hollow knee arranged to slide vertically thereon, of a table supported upon the knee, a gear-driven screw supporting the knee, a vertical drive-shaft having a bearing in the knee, a shaft extending from within the knee into the table, a train of gearing, within the knee, connecting said shaft and drive-shaft, a clutch within the knee, for connecting and disconnecting said train and reversing the movement transmitted thereby, a clutch within the knee for connecting and disconnecting the train and the knee-supporting screw, and levers at the front of the knee operatively connected with said clutches, respectively.

2. The combination with a frame, a hollow knee, and a table upon the knee, of a screw for supporting and vertically adjusting the knee, a driving-shaft having a bearing in the knee, a train of gearing transmitting motion from said driving-shaft to the table, a clutch for reversing and arresting the motion imparted by the train, a gear mounted upon the screw, and means for at will connecting said gear with one element of said train, said train, clutch, gear and means all being within the knee, substantially as set forth.

3. In a machine of the class described, the combination with a screw-shaft operatively connected with the table to slide it and provided with a pinion through which it may be driven, a hand-wheel provided with a quick gear and a slow gear, and means whereby either gear may at will be thrown into engagement with said pinion, for the purpose set forth.

4. The combination with a feed-table and a screw-shaft arranged to move the upper member thereof longitudinally and provided with a gear at the end of the table, of a dividing-head supported upon said member and capable of angular adjustment about a central horizontal axis, a dial-plate rotating about said axis, a spindle carried in the dividing-head, and means for transmitting rotary motion through said gear and dial-plate to said spindle.

5. The combination with a work-table and a screw-shaft for moving the table horizontally, of a dividing-head mounted upon the table and capable of angular adjustment in a vertical plane, a gear revoluble about the axis of such adjustment, gearing mounted upon the head and transmitting the motion of said gear to the spindle of the dividing-head, and means whereby said gear is rotated by said screw-shaft.

6. The combination with a work-table and a screw-shaft arranged to move the same back and forth, of a dividing-head mounted upon the table and adjustable about a horizontal axis, a dividing-head spindle, a dial-plate and shaft revoluble about said axis, means whereby rotation of the dial-plate shaft may adjust the spindle, and means whereby the rotation of the screw-shaft may be transmitted through the dial-plate to the spindle.

7. The combination with a feed-table and actuating devices therefor, of a dividing-head upon the table capable of angular adjustment about a horizontal axis, a spindle carried by the head, a dial-plate shaft serving as a pivotal support for the head, gearing connecting said shaft with said spindle to rotate the latter, a dial-plate mounted upon said shaft, means for rotating the shaft independently of the dial-plate, and means for driving both shaft and dial-plate in unison from the table-actuating devices.

8. The combination with a dividing-head pivoted between rigid supports to rotate upon a horizontal axis, of a spindle intersecting said axis, a spindle-locking screw in the line of said axis, a shaft lying in said axis, gearing connecting said shaft with the spindle, means whereby said gearing may be disconnected at will, means whereby said shaft may be rotated by hand or automatically, at will, and a distinct hand-operated dial rigidly fixed to the spindle for adjusting it when said gearing is disconnected.

9. The combination with the tail-stock having the parallel slotted plates, of the center carrying-block between the plates, the clamping-bolts passing through the slots in the plates and the intervening block, the block-supporting pivot having the downwardly-turned, threaded portion lying in a recess in one of the plates, and the nut engaging said portion and held in an aperture in the corresponding plate.

10. The combination with a knee having a slot, to permit the movement of parts connecting devices within the knee with a superposed table, of a slide covering the knee-slot and itself having a shorter, registering slot, and a second slide working alongside the first and having a still shorter registering slot, the lengths of the slides and slots being such that the knee-slot will be closed or covered in all possible positions of the table.

11. The combination with a main spindle and an overhanging arm supporting the same, of a block revoluble upon said spindle, means for locking the block to the arm in any position which it may assume, a transverse cutter-shaft mounted in the block at one side of the spindle, and gears carried by the block and transmitting motion from the spindle to the cutter-shaft.

12. The combination with a table having a slot above, a table upon the knee, and devices moving with the table and extending into the slot, of the superposed slides covering the slot in the knee and having themselves central slots of unequal length in which said devices lie; whereby such portions of the knee-slot as are not covered by the moving table are always kept covered by said slides, substantially as set forth.

13. The combination with a main spindle and an overhanging arm supporting its outer end, of a cutter-shaft transverse to said main spindle and at one side of the same, supported by said arm and revoluble about the main spindle, means for fixing the cutter-shaft in any portion of its path about the main spindle, and means whereby the main spindle rotates the cutter-shaft in any of its positions.

Signed at Chicago this 21st day of October, 1901.

JOHN B. FOOTE.

Witnesses:
F. N. JEWETT,
LOCKE ETHERIDGE.